United States Patent [19]
Schlosser et al.

[11] Patent Number: 5,490,452
[45] Date of Patent: Feb. 13, 1996

[54] COOKING GRATE ASSEMBLY FOR BARBECUE GRILLS

[75] Inventors: Erich J. Schlosser, Barrington; James C. Stephen, Arlington Heights, both of Ill.

[73] Assignee: Weber-Stephen Products Co., Palatine, Ill.

[21] Appl. No.: 289,942

[22] Filed: Aug. 12, 1994

[51] Int. Cl.⁶ .................................................. A47J 37/10
[52] U.S. Cl. ................................ 99/422; 99/449; 99/450; 99/340
[58] Field of Search ................................ 99/422, 450, 340, 99/425, 445, 449; 126/337 R, 332, 334; 211/187

[56] References Cited

U.S. PATENT DOCUMENTS

| | | | |
|---|---|---|---|
| 3,450,025 | 6/1969 | Fleming | 99/449 |
| 4,432,334 | 2/1984 | Holt | 99/449 |
| 4,569,279 | 2/1986 | Avner | 99/450 |
| 5,299,931 | 4/1994 | Lee | 126/25 R |

FOREIGN PATENT DOCUMENTS

| | | | |
|---|---|---|---|
| 0584069 | 1/1947 | United Kingdom | 126/337 R |

OTHER PUBLICATIONS

Copies of photographs of cooking grates labeled A, B, C, D, and E made by Weber-Stephen Products Co. Date: Known to applicants at least just prior to patent application filing date of Feb. 11, 1994.

Copies of photographs of cooking grates labeled F and G manufactured for William Sonoma. Date: Known to applicants at least just prior to patent application filing date of Feb. 11, 1994.

*Primary Examiner*—David Scherbel
*Assistant Examiner*—Reginald L. Alexander
*Attorney, Agent, or Firm*—Wallenstein & Wagner, Ltd.

[57] ABSTRACT

The present invention provides an improved cooking grate assembly 10 for use with barbecue grills. The cooking grate assembly 10 provides a cooking grate 12 that has an opening 34 and an insert 14 that is removably positioned therein. The cooking insert 14 is securely supported within the opening 34 by the supports 30 that are attached to the cooking grate 12. The insert 14 may have alternative cooking surfaces 64, 66 on opposite sides and may be flipped over to utilize the alternative surfaces 64, 66. Additionally, various cooking inserts 14, 102 having various cooking surfaces 64, 108 can be interchangeably positioned within the cooking grate 12.

22 Claims, 4 Drawing Sheets

COOKING GRATE ASSEMBLY FOR BARBECUE GRILLS

FIELD OF THE INVENTION

The present invention relates generally to barbecue grills. More specifically, the present invention relates to cooking grate assemblies having a removable and interchangeable cooking surface.

BACKGROUND OF THE INVENTION

Barbecue grills are very widely used today. Presently, one of the most popular grills is manufactured by the Assignee of the present invention WEBER-STEPHEN PRODUCTS COMPANY. This barbecue grill is a kettle-type grill and consists of a generally semispherical bottom bowl that has a circular open top with a cooking grate slightly below the upper rim of the bowl. A generally semiellipsoid top cover can be placed on the bottom bowl. Also, the bowl is supported on a tripod leg arrangement.

Barbecue grills that are designed for burning charcoal as a fuel have a charcoal grate for supporting the charcoal below the cooking surface. Both the bowl and cover have vent openings to provide the necessary oxygen for combustion of the charcoal while the cover is closed.

One type of barbecue kettle that has received very favorable acceptance by consumers is disclosed in U.S. Re. Pat. No. 33,091. U.S. Re. Pat. No. 33,091 is owned by the Assignee of the present invention and sold under the trademark ONE-TOUCH® GRILL.

In use, an individual places food items to be cooked on the cooking grate above hot charcoal. Many food items cooked on a grill can be adequately cooked on a grate. However, an individual may prefer to cook some food items on a griddle rather than on a grate. For example, pancakes, bacon, eggs, vegetables, potato hash browns and grilled cheese sandwiches are typically cooked on a griddle. Such food items may not be suitable for cooking on a cooking grate or the items may even fall through the cooking grate.

Therefore, a need exists to improve barbecue grills, and more specifically, cooking grates. There is a need to provide easier barbecue cooking of some food items and flexibility to barbecue cook a variety of food items. The present invention satisfies this need. The present invention improves barbecue grills by providing a cooking grate assembly that has a removable and interchangeable cooking insert. The cooking insert can be utilized in gas barbecue grills, such as the Assignee's GENESIS® gas grill, in addition to charcoal grills.

Other advantages and aspects of the present invention will become apparent after reading this disclosure and reviewing the accompanying drawings.

SUMMARY OF THE INVENTION

The present invention provides an improved cooking grate assembly for use with barbecue grills. The cooking grate assembly provides a cooking grate that has an opening through the cooking grate and a cooking insert that is removably positioned within the opening. The cooking insert is securely supported within the opening by supports that are attached to the cooking grate. The cooking insert may have alternative cooking surfaces on opposite sides of the cooking insert. The cooking insert may be flipped over to utilize the alternative cooking surfaces. Additionally, various cooking inserts having various cooking surfaces can be interchangeably positioned within the cooking grate.

DETAILED DESCRIPTION OF PREFERRED EMBODIMENTS

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
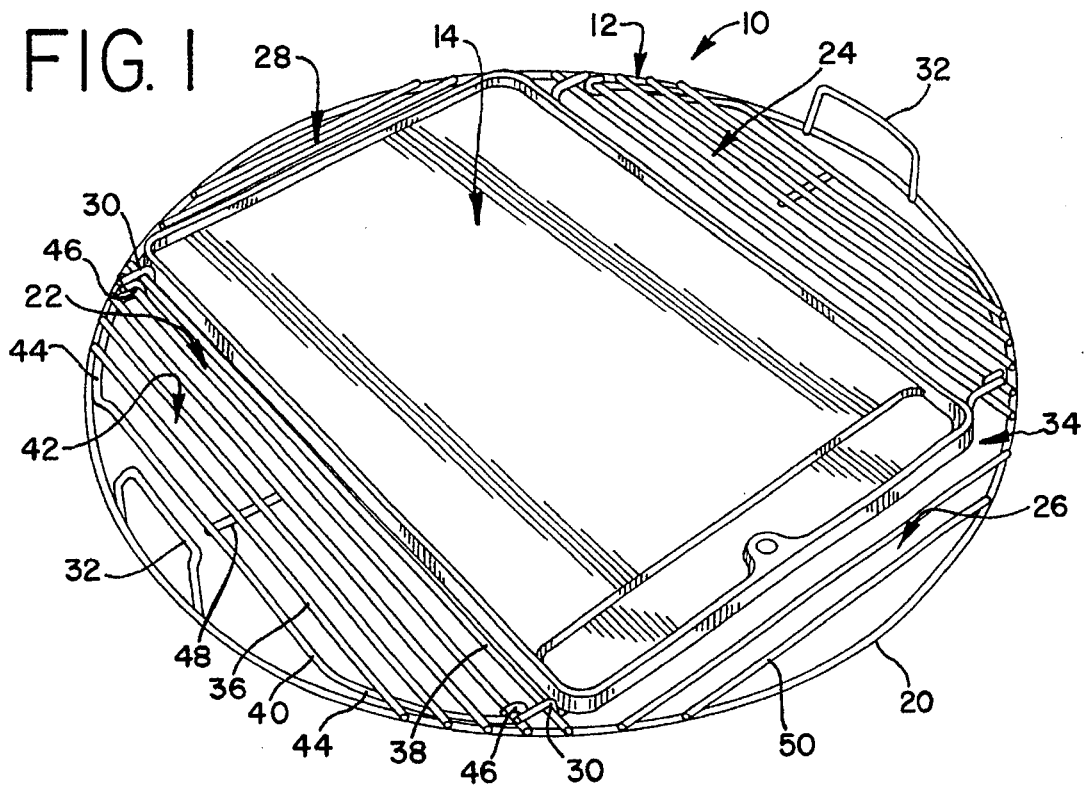
FIG. 1 is a perspective top view of a cooking grate assembly made in accordance with the principles of the present invention.

FIG. 1 shows a perspective view of a first embodiment of a cooking grate assembly 10 made in accordance with the principles of the present invention. The cooking grate assembly 10 comprises a cooking grate 12 and a removable cooking insert 14.

The cooking grate 12 is removable from the grill and is generally circular in shape; a cooking grate can also be made in other shapes, for example, square or rectangular. The cooking grate 12 has a cooking side 16, shown facing upward in FIGS. 1, 2, and a bottom side 18 shown facing downward in FIG. 3. The cooking side 16 faces away from the charcoal and supports food items during cooking; while, the bottom side 18 faces the charcoal.

The cooking grate 12 also includes a circular ring 20, a left cooking surface 22, a right cooking surface 24, a front cooking surface 26, a back cooking surface 28, and a pair of insert supports 30. The circular ring 20 is constructed from a rod and extends around the circumference of the cooking grate 12 and circumscribes the cooking surfaces 22, 24, 26, 28 which are on top of the cooking grate. A pair of handles 32 are attached to the cooking grate 12 on opposing sides of the circular ring 20. The handles 32 allow the cooking grate 12 to be easily lifted out of or placed into the grill (not shown).

The cooking grate 12 has an opening 34 therein for removable insertion of a cooking insert 14. The opening 34 is defined by a space between the four cooking surfaces 22, 24, 26, 28. The left cooking surface 22 is spaced apart from the right cooking surface 24 and the front cooking surface 26 is spaced apart from the back cooking surface 28. Alternatively, the arrangement of the cooking surfaces 22, 24, 26, 28 could be altered to position the opening 34 through the cooking grate 12 in a different location. Likewise, the number of cooking surfaces could be reduced or increased and the number of openings could be increased.

The left cooking surface 22 is constructed from spaced apart, parallel rods 36. The rods 36 are substantially co-planer which makes the left cooking surface 22 substantially planer. The length of the parallel rods 36 vary with the longest parallel rod 38 being closest to the opening 34 and the shortest parallel rod 40 being furthest away from the opening. The two rods closest to the opening 34 are attached to the perimeter of the circular ring 20 at the ends of the rods. The remaining rods 36 rest on the top of the circular ring 20 adjacent the end of each rod and define a hinged portion 42 of the left cooking surface 22. The shortest parallel rod 40, which is furthest from the opening 34, provides two opposing curved extensions 44. The two extensions 44 are connected to the hinged portion 42 near the ends of the rods that are resting on the circular ring 20. The extensions 44 have ends that wrap around one of the rods connected to circular ring 20 to form hinges 46. The hinges 46 allow the hinged portion 42 to pivot in relation to the cooking grate 12 as described below. A connector rod 48 is connected to the hinged portion 42 underneath the hinged portion 42. The connector rod 48 is perpendicular to the parallel rods 36 and provides additional support for the hinged portion 42. The right cooking surface 24 is the mirror image of and is constructed the same as the left cooking surface 22. Accordingly, the rods 36 of the right cooking surface 24 are substantially parallel to the rods of the left cooking surface 22.

The front cooking surface 26 is similarly constructed from spaced, parallel rods 50. The rods 50 are substantially co-planer which makes the front cooking surface 26 substantially planer. The length of the parallel rods 50 vary with the longest parallel rod being closest to the opening 34 and the shortest parallel rod being furthest away from the opening. All of the front cooking surface rods 50 are attached to the circular ring 20 at the ends of the rods. The back cooking surface 28 is the mirror image of and is constructed the same as the front cooking surface 26. Accordingly, the rods 50 of the front cooking surface 26 are substantially parallel to the rods of the back cooking surface 28.

The left cooking surface 22, the right cooking surface 24, the front cooking surface 26, and the back cooking surface 28 are substantially co-planer with each other. The rods 36 of the left and the right cooking surfaces 22, 24 are substantially perpendicular to the rods 50 of the front and the back cooking surfaces 26, 28. Preferably, the cooking grate 12 comprises the four cooking surfaces 22, 24, 26, 28; although, the cooking grate may have fewer or more cooking surfaces.

The hinged portions 42 Of the left cooking surface 22 and the right cooking surface 24 are pivotally connected to the cooking grate 12 by the hinges 46. The hinges 46 allow the hinged portions 42 to be individually pivoted from substantially horizontal positions through various inclined positions to a substantially vertical position relative to the cooking grate 12. When the hinged portions 42 are pivoted above the cooking grate 12 there is easy access to the space in the grill below the cooking grate without removing the cooking grate from the grill. For example, the hinged portions 42 may be pivoted above the cooking grate 12 to add charcoal to the grill or rearrange the charcoal already in the grill.

Figure 4:
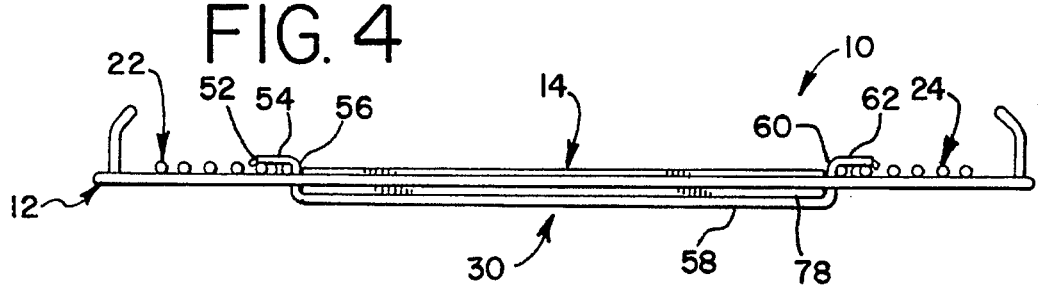
FIG. 4 is a front side view of the grate assembly of FIG. 2.

As shown in FIG. 4, the pair of insert supports 30 are also constructed from the rods 52. Each one of the supports 30 comprises a first end 54, a first vertical section 56, a midsection 58, a second vertical section 60, and a second end 62. The first end 54 is connected to the left cooking surface 22 of the cooking grate 12. Particularly, the first end 54 is connected to the rods 36 of the left cooking surface 22 that are connected to the circular ring 20. The first vertical section 56 extends vertically and downward from the first end 54 to below the opening 34. The second end 62 of the insert support 30 is connected to the right cooking surface 24. Particularly, the second end 62 is connected to the rods 36 of the right cooking surface 24 that are connected to the circular ring 20. The second vertical section 60 extends vertically and downward from the second end 62 to below the opening 34. The midsection 58 extends from the first vertical section 56 below and across the opening 34 to the second vertical section 60. The midsections 58 are substantially horizontal and supportively contact the cooking insert 14 as described below. The pair of insert supports 30 are spaced apart from each other at opposite ends of the central opening 34 such that one insert support is close to the front cooking surface 26 and the other insert support is close to the back cooking surface 28. The insert supports 30 are substantially parallel to the front and the back cooking surfaces 26, 28 and are substantially perpendicular to the left and the right cooking surfaces 22, 24.

Figure 2:
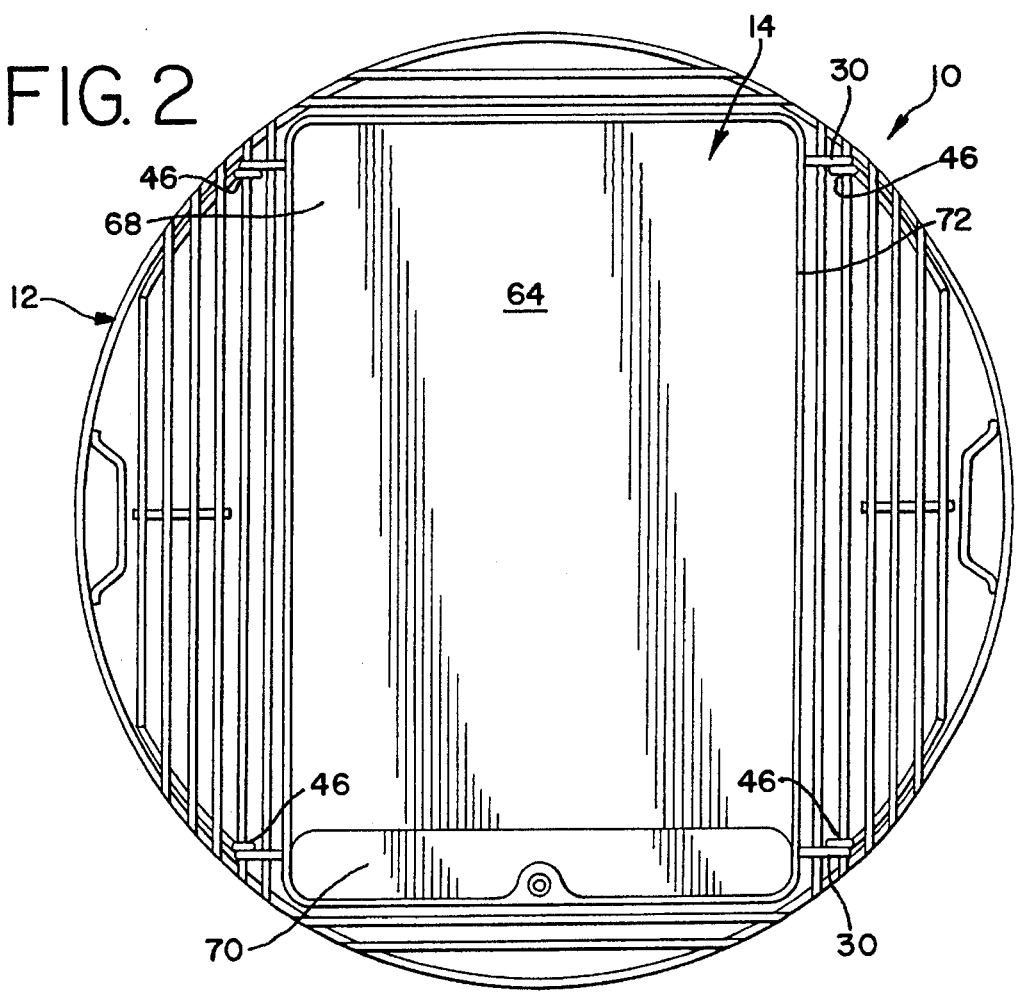
FIG. 2 is a top view of the grate assembly of FIG. 1 with a cooking insert having a flat griddle.
Figure 3:
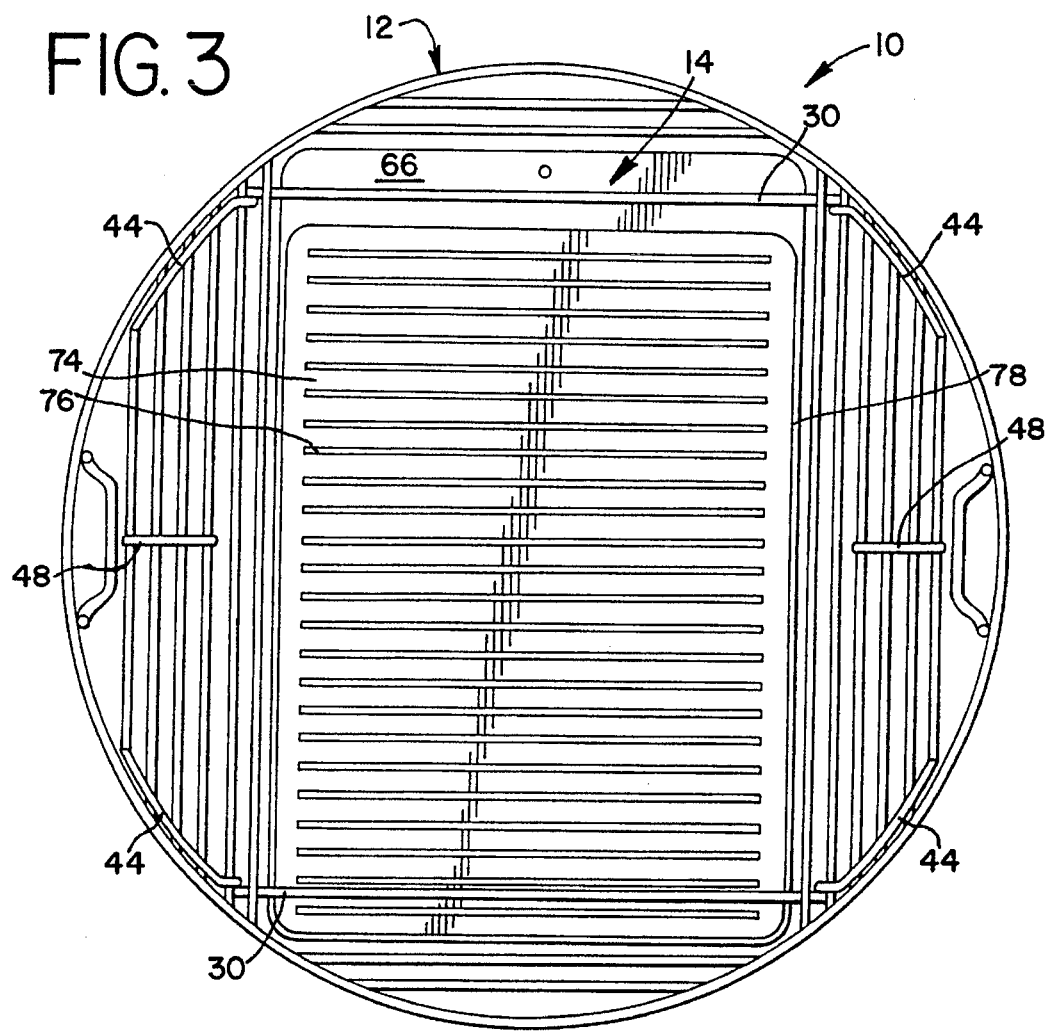
FIG. 3 is a bottom view of the grate assembly of FIG. 1 with a cooking insert having a ridged griddle.

FIG. 2 shows a top view of the assembly 10 with the cooking insert 14. The cooking insert 14 is preferably constructed from cast iron. The cooking insert 14 comprises a flat griddle side 64 and an opposed ridged griddle side 66. The ridged griddle side 66 is shown in FIG. 3. Referring back to FIG. 2, the flat griddle side 64 is shown facing upward and has a griddle surface 68, a trough 70 and a first raised edge 72. The griddle surface 68 is flat and extends over substantially most of the area of the flat griddle side 64. The trough 70 is also flat and extends over the remaining area of the flat griddle side 64. The trough 70 is recessed below the griddle surface 68 and may be inclined. The first raised edge 72 circumscribes the flat griddle side 64 of the cooking insert 14 and extends above the trough 70 and the griddle surface 68. The first raised edge 72 retains food items on the flat griddle side 64 should the food items run and contact the first raised edge 72. Further, the first raised edge 72 rests against the insert supports 30 when the flat griddle side 64 is facing downward. The flat griddle side 64 may be used to barbecue cook food items such as pancakes, fried eggs, or grilled cheese sandwiches.

FIG. 3 shows a bottom view of the assembly 10 with the cooking insert 14 having a ridged griddle side 66. The ridged griddle side 66 comprises a flat surface 74 on top with ridges 76 protruding therefrom. The ridges 76 are spaced apart from each other and substantially parallel. The ridged griddle side 66 further includes a second raised edge 78. The second raised edge 78 circumscribes the ridged griddle side 66 and extends above the flat surface 74 to the same height as the ridges 76. The second raised edge 78 retains food items within the griddle. Further, the second raised edge 78 rests against the insert supports 30 when the ridged griddle side 66 is facing downward. The ridged griddle side 66 may be used to barbecue cook food items such as bacon.

Figure 5:
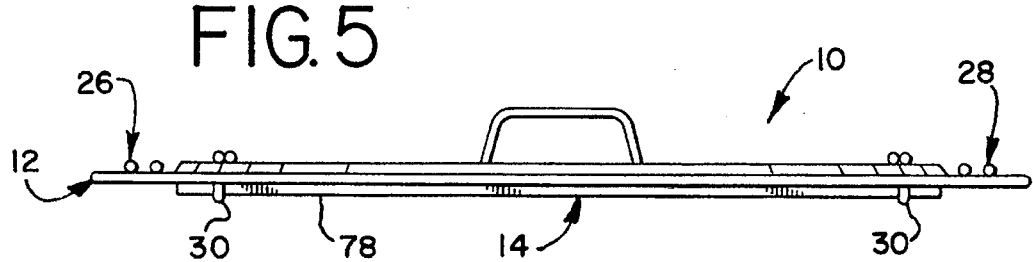
FIG. 5 is a right side view of the grate assembly of FIG. 2.

FIG. 4 shows a front side view and FIG. 5 shows a right side view of the cooking grate assembly 10 with the cooking insert 14. Particularly, FIGS. 4 and 5 show the insert supports 30 supporting the cooking insert 14 within the opening 34. The second raised edge 78 of the ridged griddle side 66 rests on or is supported by the midsection 58 of the insert supports 30. The midsection 58 contacts and supports the second raised edge 78 at a predetermined distance below the cooking grate 12. The predetermined distance is defined by the length of the first and second vertical sections 56, 60 of the insert supports 30. Supporting the second raised edge 78 at the predetermined distance below the cooking grate 12 recesses the cooking insert 14 within the opening 34 of the cooking grate. The cooking insert 14 is recessed such that the first raised edge 72 and the flat griddle surface 64 are approximately co-planer with the cooking surfaces 22, 24, 26, 28. The cooking insert 14 can be removed from the cooking grate 12, flipped over, and returned to its position within the opening 34. When the cooking insert 14 is flipped over, the cooking insert is recessed and supported within the cooking grate 12 in the same manner as before the cooking insert was flipped over. Accordingly, the cooking insert 14 can be positioned within the opening 34 to have the flat griddle side 64 facing upward and alternatively positioned within the opening to have the ridged griddle side 66 facing upward.

The cooking insert 14 is securely supported within the opening 34 by the insert supports 30. The cooking insert 14 is prevented from tilting within the opening 34 of the cooking grate 12. The midsections 58 of the insert supports 30 extend across the opening 34 and support the cooking insert 14 on the raised edges 72 or 78 that are separated by the entire width of the cooking insert. Further, the insert supports 30 are spaced apart from each other such that the insert supports are at opposite ends of the opening 34. The cooking insert 14 is prevented from excessively sliding on the insert supports 30 because the cooking insert is recessed within the cooking grate 12. The rods 36, 50 of a cooking surface 22, 24, 26, 28 next to the opening 34 will prevent the cooking insert 14 from sliding on the insert supports 30. Further, the vertical sections 56, 60 of the insert supports 30 will also prevent the cooking insert 14 from sliding on the insert supports towards the left or the right cooking surfaces 22, 24. The circular ring 20 may also prevent the cooking insert 14 from sliding on the insert supports 30 by contacting the corners of the insert support.

Figure 6:
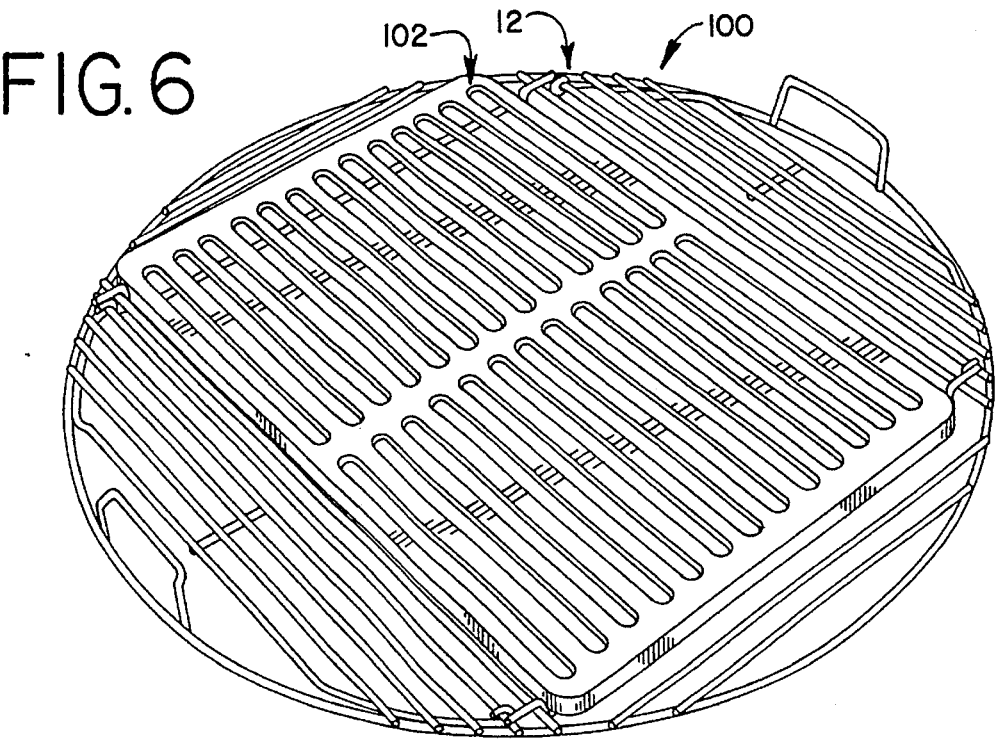
FIG. 6 is a perspective top view of another cooking grate assembly made in accordance with the principles of the present invention.

FIGS. 6–10 show another cooking grate assembly 100 made in accordance with the principles of the present invention. Referring to FIG. 6, the cooking grate assembly 100 comprises a cooking grate 12 and a removable cooking insert 102. The cooking grate 12 is the same cooking grate 12 as described above. However, the cooking insert 102 provides different features than the cooking insert 14 described above.

Figure 7:
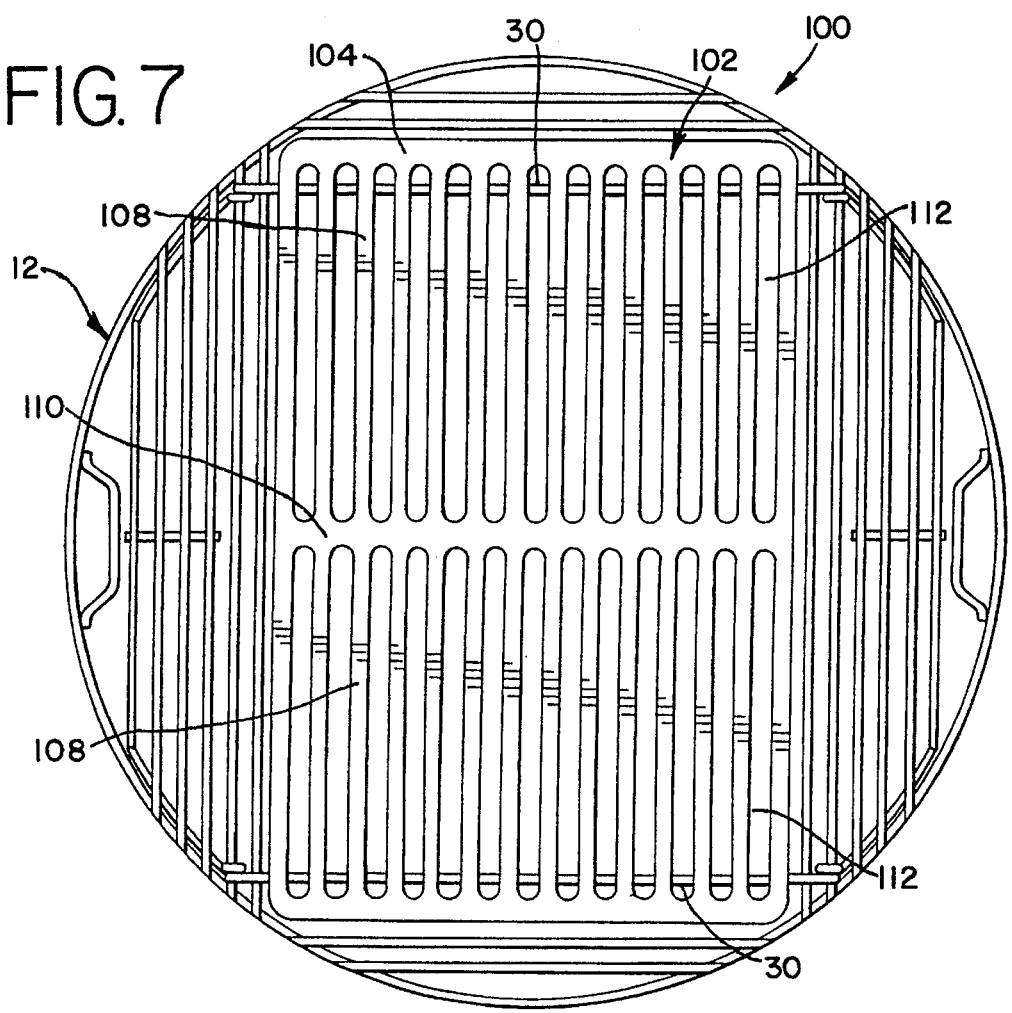
FIG. 7 is a top view of the grate assembly of FIG. 6 with a cooking insert having a flat grate.
Figure 8:
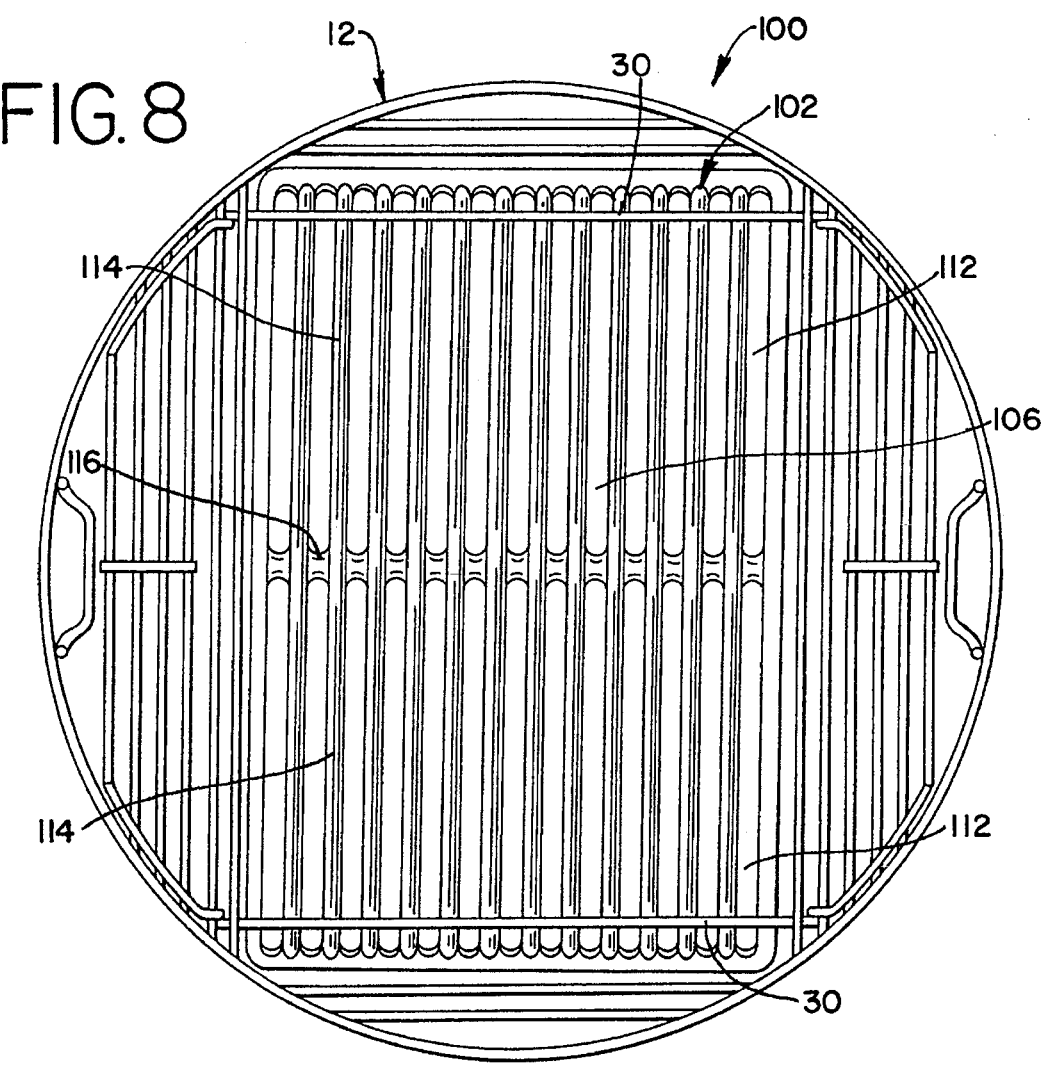
FIG. 8 is a bottom view of the grate assembly of FIG. 6 with a cooking insert having a rounded grate.

FIG. 7 shows a top view of cooking grate assembly 100 with the cooking insert 102. The cooking insert 102 is also preferably constructed from cast iron. The cooking insert 102 comprises a flat grate side 104 and a rounded grate side 106 opposite the flat grate side. The rounded grate side 106 is shown in FIG. 8. Referring back to FIG. 7, the flat grate side 104 is shown facing upward and comprises a row of parallel flat grates 108. The row of flat grates 108 has a flat middle section 110 extending across the width of the flat grate side 104. The flat grates 108 are spaced from each other by elongated spaces 112. The elongated spaces 112 extend through the cooking insert 102 from the flat grate side 104 to the rounded grate side 106. The flat grate side 104 is flat over the entire side and extends over the entire area of the flat grate side. The flat grate side 104, particularly the flat grates 108, rests against the insert supports 30 when the flat grate side is facing downward in the cooking grate assembly 100. The flat grate side 104 may be used to barbecue cook food items that would usually be cooked on a grate. The relatively wide, flat shape of the flat grates 108 provides greater contact area for food items than a relatively narrow or rounded grate.

FIG. 8 shows a bottom view of the cooking grate assembly 100 with the cooking insert 102 having a rounded grate side 106. The rounded grate side 106 is shown facing downward and comprises a row of parallel rounded grates 114. The row of rounded grates 114 has a rounded middle section 116 extending across the width of the rounded grate side 106. The rounded grates 114 are spaced from each other by the same elongated spaces 112 between the flat grates 108. The rounded grate side 106, particularly the rounded grates 114, rests against the insert supports 30 when the rounded grate side is facing downward in the cooking grate assembly 100. The rounded grate side 106 may be used to barbecue cook food items that would usually be cooked on a grate. The rounded grates 114 provide relatively less contact area for food items than the flat grates 108 and permit easier run off of any grease.

Figure 9:
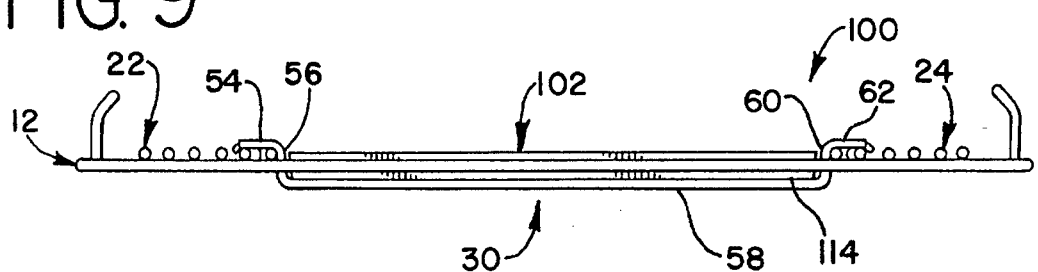
FIG. 9 is a front side view of the grate assembly of FIG. 7.
Figure 10:
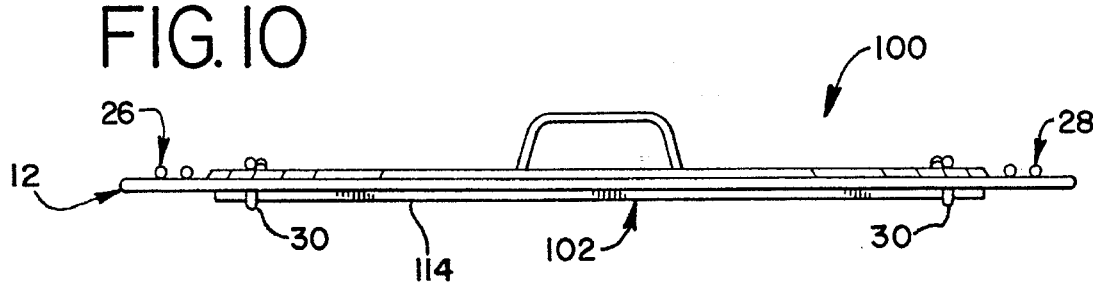
FIG. 10 is a right side view of the grate assembly of FIG. 7.

FIG. 9 shows a front side view and FIG. 10 shows a right side view of the cooking grate assembly 100 with the cooking insert 102. Particularly, FIGS. 9 and 10 show the insert supports 30 supporting the cooking insert 102 within the opening 34. The rounded grates 114 of the rounded grate side 106 rest on or are supported by the midsections 58 of the insert supports 30. If the cooking insert 102 is flipped over then the flat grates 108 of the flat grate side 104 rest on or are supported by the midsections 58. The cooking insert 102 is recessed within the opening 34 of the cooking grate 12 as described above in regards to the cooking insert 14. The cooking insert 102 is also securely supported within the opening 34 as discussed above.

In using the cooking grate assembly 10, charcoal is placed on the charcoal grate in the bottom bowl of the grill. The charcoal is ignited and allowed to become hot. An appropriate cooking insert 14 is selected depending on the type of food items to be cooked on the grill. The cooking grate assembly 10 is assembled by placing the cooking insert 14 within the opening 34 of the cooking grate 12. If the first cooking insert 14, with its alternative cooking sides 64, 66, is desired, then the cooking insert is placed within the opening 34 with the desired cooking side facing upward. Of course, if the cooking insert 14 has only one cooking side then the cooking insert is placed within the opening 34 with the cooking side facing upward.

When the cooking insert 14 is placed in the opening 34, the side of the cooking insert facing downward contacts the insert supports 30. The insert supports 30 securely support the cooking insert 14 within the opening. Particularly, the insert supports 30 contact the raised edge 72 or 78, or the grates 108 or 114, of the downward facing side. The food items are then placed on the cooking side of the cooking insert 14 and may also be placed on the cooking surfaces 22, 24, 26, 28.

The hinged portions 42 of the left and the right cooking surfaces 22, 24 may be raised to add charcoal to the grill or to rearrange charcoal existing within the grill. Accordingly, charcoal can be added or rearranged without removing the cooking grate assembly 10 from the grill.

If a different cooking insert or cooking insert surface is desired, the cooking insert may be removed from the cooking grate assembly 10 during barbecue cooking while the cooking grate 12 remains in the grill. The desired cooking insert is then placed on the insert supports 30 within the opening 34 with the desired cooking surface facing upward. Other cooking inserts include a wok, a steamer and a fish cooker or grill. Each of these inserts is constructed similarly to the above described designs and cooperates in the same manner with the cooking grate, also described above.

While the preferred embodiments have been illustrated and described, numerous changes and modifications can be made without significantly departing from the spirit and scope of this invention. Therefore, the inventors intend that such changes and modifications be covered by the appended claims.

We claim:

1. A cooking grate assembly for use with a barbecue grill comprising:

a cooking grate defining an opening through the cooking grate;

a cooking insert removably positioned within the opening; and, means associated with the cooking grate below the cooking grate for supporting the cooking insert within the opening, the means for supporting in supportive contact with the cooking insert below the cooking grate.

2. The cooking grate assembly of claim 1 wherein the cooking grate comprises:

a circular ring; and, a plurality of substantially parallel, spaced apart rods, the circular ring circumscribing the rods.

3. The cooking grate assembly of claim 1 wherein the cooking grate comprises:

a first cooking surface at one side of the cooking grate; and, a second cooking surface at an opposed side of the cooking grate, the first cooking surface being spaced apart from the second cooking surface by the opening.

4. The cooking grate assembly of claim 3 wherein the cooking grate further comprises:

a third cooking surface at one end of the cooking grate; and, a fourth cooking surface at an opposed end of the cooking grate, the third cooking surface being spaced apart from the fourth cooking surface by the opening.

5. The cooking grate assembly of claim 3 wherein the first cooking surface and the second cooking surface each have a hinged portion, the hinged portions pivotally connected to the cooking grate and, the hinged portions being pivotal above the cooking grate.

6. The cooking grate assembly of claim 1 wherein the cooking insert comprises a flat griddle side and a ridged griddle side and can be positioned within the opening such that the flat griddle side faces upward and alternatively positioned within the opening such that the ridged griddle side faces upward.

7. The cooking grate assembly of claim 6 wherein the flat griddle side comprises:

a flat griddle surface extending over substantially all of the flat griddle side;

a trough recessed below the flat griddle surface; and, a first raised edge circumscribing the flat griddle side.

8. The cooking grate assembly of claim 6 wherein the ridged griddle side comprises:

a flat surface on top of the ridged griddle side;

a plurality of ridges protruding from the flat surface; and, a second raised edge circumscribing the ridged griddle side.

9. The cooking grate assembly of claim 1 wherein the cooking insert comprises a flat grate side and a rounded grate side and can be positioned within the opening such that the flat grate side faces upward and alternatively positioned within the opening such that the rounded grate side faces upward.

10. The cooking grate assembly of claim 1 wherein the means for supporting comprises:

a pair of insert supports positioned at opposite ends of the opening and having a substantially horizontal section that is in supportive contact with the cooking insert.

11. The cooking grate assembly of claim 10 wherein the substantially horizontal section is spaced below the cooking grate at a predetermined distance to recess the cooking insert within the cooking grate.

12. The cooking grate assembly of claim 1 wherein the means for supporting comprises a pair of insert supports, each insert support comprising:

two ends connected to the cooking grate;

two vertical sections, each extending downwardly from one of the ends to below the opening; and, a midsection extending from one of the vertical sections across and below the opening to the other vertical section, the midsection in supportive contact with the cooking insert.

13. The cooking grate assembly of claim 12 wherein the midsection is substantially horizontal.

14. A cooking grate assembly comprising:

a cooking grate having a cooking side with an opening therein;

a cooking insert having a first side and a second, opposed side; and, means associated with the cooking grate and the cooking insert below the cooking grate for removably supporting the cooking insert within the opening on alternatively either the first side or the second side.

15. The cooking grate assembly of claim 14 wherein the means for supporting comprises:

a pair of supports attached to and spaced below the cooking grate, the pair of supports contacting the second side of the cooking insert.

16. The cooking grate assembly of claim 15 wherein each support comprises:

a first end connected to the cooking grate;

a first vertical section extending downwardly from the first end to below the cooking grate;

a second end connected to the cooking grate;

a second vertical section extending downwardly from the second end to below the cooking grate; and, a midsection extending across the opening below the cooking grate to connect the first vertical section to the second vertical section.

17. The cooking grate assembly of claim 14 wherein the cooking grate comprises a first cooking surface and a second cooking surface, the second cooking surface spaced apart from the first cooking surface by the opening.

18. The cooking grate assembly of claim 17 wherein the first cooking surface and the second cooking surface are hingedly coupled to the cooking grate, the cooking surfaces being individually pivotal about their hinges from a substantially horizontal position.

19. The cooking grate assembly of claim 14 wherein the cooking insert comprises:

a substantially flat cooking side having a trough recessed below the flat cooking side; and, a ridged cooking side opposite the flat cooking side.

20. The cooking grate assembly of claim 14 wherein the cooking insert comprises a cooking grate.

21. A method for assembling a cooking grate for use with a barbecue grill comprising the steps of:

providing a cooking grate having an opening through the cooking grate;

positioning a cooking insert within the opening; and, supporting the cooking insert within the opening by supportively contacting the cooking insert below the cooking grate.

22. The method for assembling a cooking grate of claim 21 further comprising the steps of:

removing the cooking insert from the opening;

flipping the cooking insert over;

positioning the cooking insert within the opening; and, supporting the cooking insert within the opening by supportively contacting the cooking insert below the cooking grate.

* * * * *